United States Patent [19]

Thompson et al.

[11] Patent Number: 5,059,280
[45] Date of Patent: Oct. 22, 1991

[54] METHOD FOR REMOVING AGGLOMERATED PARTICLES AFTER DRY FIBERIZING WASTEPAPER

[75] Inventors: Roger B. Thompson, Neenah; Christine L. Goulet, Appleton, both of Wis.

[73] Assignee: Kimberly-Clark Corporation, Neenah, Wis.

[21] Appl. No.: 612,756

[22] Filed: Nov. 14, 1990

Related U.S. Application Data

[63] Continuation-in-part of Ser. No. 388,772, Jul. 31, 1989, abandoned.

[51] Int. Cl.$^5$ ............................................. D21C 5/02
[52] U.S. Cl. ................................ 162/4; 162/55
[58] Field of Search .................................. 162/4, 5, 55

[56] References Cited

U.S. PATENT DOCUMENTS

| | | | |
|---|---|---|---|
| 3,057,769 | 10/1962 | Sandberg | 182/4 |
| 4,312,701 | 1/1982 | Campbell | 162/4 |
| 4,360,439 | 11/1982 | Calmanti et al. | 162/5 |
| 4,518,459 | 5/1985 | Freis et al. | 162/5 |
| 4,668,339 | 5/1987 | Terry | 162/4 |
| 4,780,179 | 10/1988 | Clement | 162/5 |

Primary Examiner—Karen M. Hastings
Attorney, Agent, or Firm—Gregory E. Croft

[57] ABSTRACT

Agglomerated ink-containing particles formed during the fiberization of wastepaper in a dry deinking process can be condensed and streamlined in shape to render them more readily separable from the balance of the fiberized wastepaper by slurrying the fiberized wastepaper with water at a temperature of about 130° F. or greater with appropriate agitation.

6 Claims, 3 Drawing Sheets

METHOD FOR REMOVING AGGLOMERATED PARTICLES AFTER DRY FIBERIZING WASTEPAPER

This is a continuation-in-part of copending application(s) Ser. No. 07/388,772 filed on July 31, 1989 now abandoned.

BACKGROUND OF THE INVENTION

U.S. Pat. No. 4,668,339 entitled "Process For Dry Deinking of Secondary Fiber Sources" issued to Byron R. Terry describes a unique method of deinking wastepaper. The method resulted from the discovery that ink particles can be dislodged from wastepaper fibers by dry fiberization if the fiberization is carried out to the extent that the wastepaper is reduced to substantially individual fibers and fines. In the process much of the ink is reduced to ink particles and ink-containing fines, which can be simply removed by dry separation using a variety of separation means, such as screens or other related cleaning devices.

Although the process of Terry works well, it has been discovered that at high fiberizer throughputs, much of the wastepaper ink agglomerates into visible ink specks which do not readily separate by dry or conventional wet methods. In fact, the nature and numbers of these ink agglomerates sometimes can be such that the fiberized material actually appears to be dirtier than the original starting material fed to the fiberizer. It is postulated that at high fiberizer throughputs, heat is generated within the fiberizer which causes the dislodged ink particles to agglomerate to each other and to bind to the fibers. The nature and shape of the resulting particles is such that they are not easily removed from the fibers. Hence there is a need for a method capable of removing these agglomerated ink-particles from the acceptable fibers produced by a dry fiberization deinking process.

SUMMARY OF THE INVENTION

In general, the invention resides in a method for deinking wastepaper comprising: (a) fiberizing the wastepaper at a temperature of about 130° F. or greater in a manner sufficient to create agglomerated particles containing ink, fibers, fiber fragments and ink-containing fines; (b) slurrying the fiberized wastepaper with water at a temperature of about 130° F. or greater with sufficient agitation to condense the agglomerated ink particles and streamline their shape to render them more easily separable from the fiberized wastepaper; and (c) separating the agglomerated particles from the balance of the fiberized wastepaper. Preferably, the fiberized wastepaper is cleaned or partially deinked prior to being slurried with water in step (b) in order to remove as much of the ink, ash, fiber fragments, and ink-containing fines as possible to reduce the load on downstream processing. Such cleaning is preferably by dry separation as described in the abovesaid U.S. Pat. No. 4,668,339 to Terry and U.S. Pat. No. 4,689,143 entitled "Drum Separator" issued to Robert M. Miers, which patents are both incorporated herein by reference. However, such a cleaning step is not necessary to obtain a benefit from the method of this invention.

The agglomerated particles created during the fiberization step manifest themselves as visible specks in any paper made from the fiberized wastepaper. The agglomerated particles often have a very irregular shape and size, the largest dimension of which can be from about 0.2 to about 1.5 millimeters. The nature of these particles will be more clearly described hereinafter with reference to the Drawing.

Slurrying of the fiberized wastepaper with water at elevated temperature is critical to the efficiency of the method of this invention. In order to effect condensing of the agglomerated particles to enhance subsequent separation, the temperature of the aqueous slurry must be about 130° F. or greater and preferably about 150° F. or greater. Temperatures above 212° F., while within the scope of this invention, are economically less desirable and unnecessary.

In addition to an elevated temperature, there must be a sufficient combination of degree of agitation, time, and slurry consistency to achieve the particle-to-particle contact necessary for the agglomerated particles to grow, condense, and streamline their shape sufficiently to be subsequently more readily separated or removed from the desirable fibers. In general, it is believed that the consistency of the fibrous slurry must be at least about 5 weight percent, preferably from about 10 to about 30 percent. The agitation time can range from instantaneous, when using a disc attrition device, to about 20 minutes or more when using a less vigorous agitation device, such as a pulper.

Separating the condensed agglomerated particles from the balance of the fiberized wastepaper is preferably accomplished using high performance centrifugal cleaners. However, because centrifugal cleaners are designed to remove a relatively narrow size range of particles, it is preferred that the fiberized wastepaper be prescreened to remove the largest particles which would not be efficiently removed by the chosen centrifugal cleaner. The nature of the screening device and the size of the screen openings will of course depend upon the nature of the material being screened. Centrifugal cleaners having a diameter of about 3 inches or less, operating at a pressure drop of about 40 psi from inlet to outlet, have been found to be very effective, although other sizes and pressure drops can also be used depending on a host of processing considerations.

DETAILED DESCRIPTION OF THE DRAWING

Figure 1:
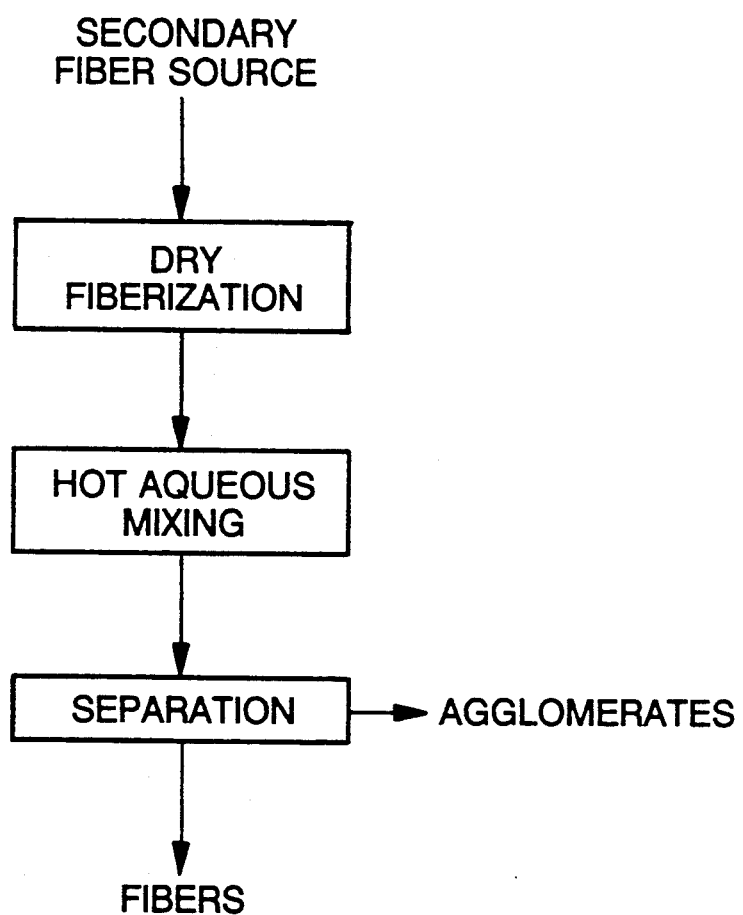
FIG. 1 is a block flow diagram of the process of this invention.

Referring to FIG. 1, the method of this invention will be described in greater detail. Shown in FIG. 1 is a block flow diagram illustrating the three process steps essential to the method of this invention. The first step is dry fiberization of the secondary fiber source (wastepaper) in a manner similar to that described in the abovesaid Terry patent. However, substantially complete fiberization of the wastepaper feed material, although desirable, is not necessary for purposes of this invention because the subsequent process steps can remove a majority of the remaining ink-containing matter. As mentioned earlier, if the dry fiberization is carried out without a significant temperature increase, formation of agglomerated particles is minimal or absent. However, creation of agglomerated particles within the fiberizer during fiberization can occur if a temperature of about 130° F. or greater is generated within the fiberizer, primarily due to friction within the fiberizer caused by overfeeding to increase throughput. In such cases the method of this invention is necessary to adequately remove the agglomerated particles.

In conjunction with the dry fiberization step, it is preferred that any dry-separable ink particles and ink-containing fines created during fiberization be removed by dry separation to reduce the load on subsequent processing apparatus. As previously mentioned, suitable dry separation apparatus is described in the Terry patent and in the Miers patent.

After dry fiberization or dry deinking, the fiberized material is subjected to an aqueous hot agitation or mixing treatment in which the fiberized material is slurried with water at a temperature of at least about 130° F. In order to increase particle-to-particle contact and promote further agglomeration and compaction or streamlining of the agglomerated particles, consistencies of at least about 14 weight percent solids are preferred. A high degree of agitation is also desirable, which can be achieved, for example, by slurrying the fiberized material in a high consistency pulper or by disk refining, both methods being well known in the paper industry. The result of the hot agitation step is to transform the agglomerated particles into a different form which can more readily be separated from the fibrous mass of cleaned fibers. These altered agglomerated particles are more compact and streamlined than those created during the fiberization step.

After the hot agitation step, the slurry is directed to one or more separation devices, such as high performance centrifugal cleaners (hydrocyclones), which are well known readily available pieces of equipment commonly used to remove dirt particles from aqueous suspensions of pulp. However, it has been found that for purposes of removing the agglomerated particles modified during the hot agitation step, the centrifugal cleaners must be designed to create a high degree of centrifugal force. This is readily achieved by using a hydrocyclone having an inside diameter of about 3 inches or less and a pressure drop of at least about 40 psi at about 0.6 consistency or less. Naturally, to achieve such low consistencies, the high consistency slurry from the hot agitation step must be supplemented with additional water to dilute the slurry to the desired level.

After the agglomerated particles have been removed from the balance of the fiberized wastepaper, the remaining material can be dried and stored or it can be used directly in making paper. In fact it is convenient to incorporate the method of this invention into the stock preparation procedure of the papermaking process, utilizing the pulper for the hot agitation step and adding the separation step between the pulper and the formation zone.

For purposes of ascertaining the effectiveness of the method of this invention, the presence of agglomerated particles can be measured as dirt count as determined by TAPPI method T 213 using a Paprican Microscanner. The method of this invention is particularly suitable for removing non-impact printing inks, although it also can be used for wastepapers containing a variety of other inks, including impact printing inks or mixtures of different inks.

Figure 2:
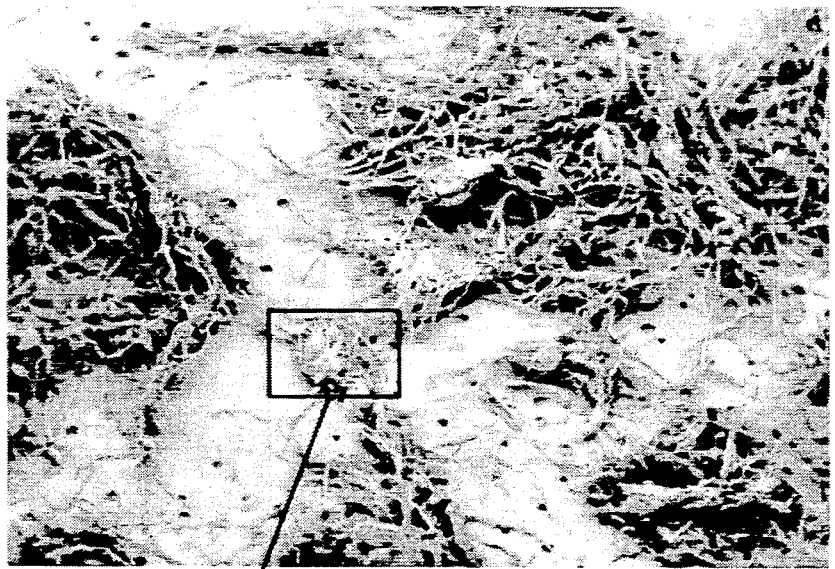
FIG. 2 is a photomicrograph (15×) of typical fiberized wastepaper as it leaves the fiberizer, illustrating the nature of the agglomerated particles.

FIG. 2 is a photomicrograph (15×) of typical fiberized wastepaper containing agglomerated particles created during the fiberization step. As shown, these particles contain a variety of constituents, including ink, fibers, fiber fragments, and ink-containing particles. Due to the presence of trapped fibers extending outwardly and the irregular shape, particles of this type are not readily separable from the rest of the fiberized material.

Figure 3:
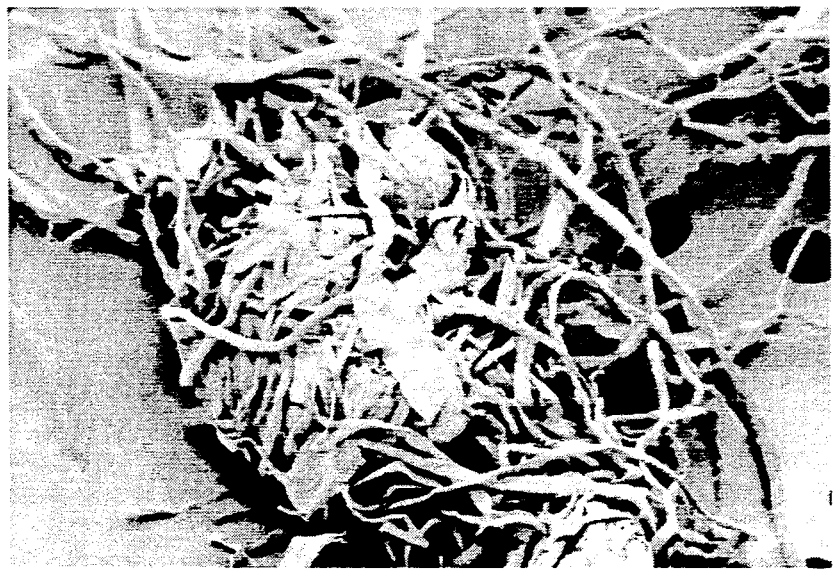
FIG. 3 is a photomicrograph (100×) of one of the agglomerated particles shown in FIG. 2.

FIG. 3 is a photomicrograph (100×) of a portion of the material shown in FIG. 2, more clearly illustrating the nature of the agglomerated particles.

Figure 4:
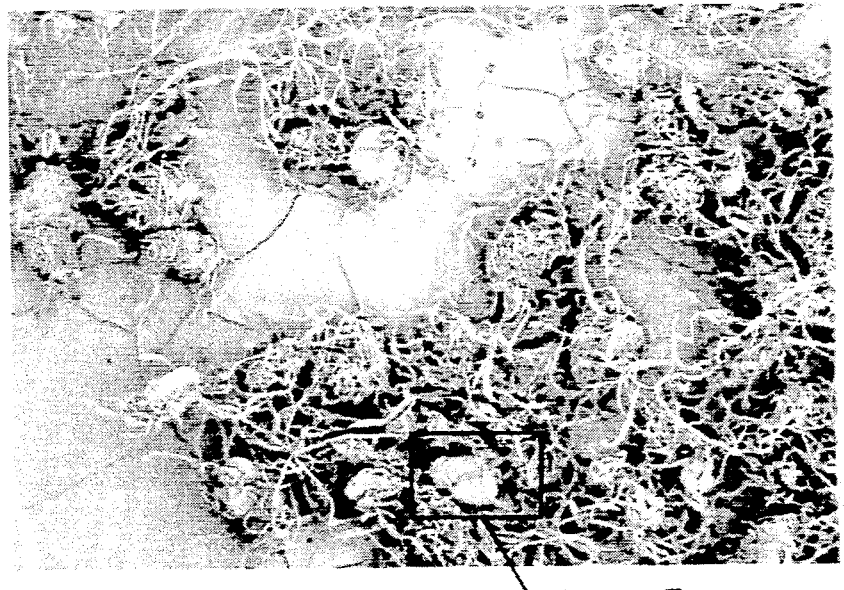
FIG. 4 is a photomicrograph (15×) of typical fiberized wastepaper after the aqueous heat treatment of this invention, illustrating how the agglomerated particles have been condensed or streamlined.

FIG. 4 is a photomicrograph (15×) of typical fiberized wastepaper after the hot agitation step of this invention, illustrating the change in nature or transformation of the agglomerated particles. As is apparent from the photograph, the agglomerated particles are more distinct, more dense and smoother than those shown in FIG. 2. This change in shape and texture, which is referred to herein as "condensing" or "transforming" the agglomerated particles, enables these agglomerated particles to be more readily separated out from the balance of the fibers as previously described. The size range of the transformed agglomerated particles is still the same as the size range of the agglomerated particles, i.e. the largest dimension is from about 0.2 to about 1.5 millimeters, even though some transformed particles may be larger than the seed particles from which they grew.

Figure 5:
FIG. 5 is a photomicrograph (100×) of one of the condensed agglomerated particles shown in FIG. 4.

FIG. 5 is a photomicrograph (100×) of a portion of the material shown in FIG. 4, further illustrating the nature of the agglomerated particles resulting from the hot agitation step of this invention.

EXAMPLES

EXAMPLE 1

Wastepaper consisting of white ledger, of which 30% was electrostaticly printed, having a TAPPI equivalent area dirt count of 309 parts per million (PPM) was fed to a Pallmann 12-D fiberizer at a feed rate of 75 pounds per minute. Fiberizer discharge temperature was 195° F., which is conducive to agglomeration of dispersed ink particles.

The fiberized wastepaper was cleaned or partially deinked by condensing the material on a vacuum filter under conditions favorable to removal of ink and fiber fines. The resulting fibrous material had a dirt count of 610 PPM.

This fibrous material was slurried with water in a low consistency pulper at a temperature of 100° F. for 15 minutes at a consistency of 6.6%. The fiber slurry was thickened to 26.4% consistency and heated to 186° F. The hot thickened fiber slurry was agitated in a continuous fiber kneading device (a MICAR ™ mixer manufactured by Black Clawson of Middletown, Ohio) having a retention time of less than 1 minute. The treated material was then diluted below 0.7% consistency and fed to various hydrocyclones. A dirt count of 146 PPM was obtained using a 5-inch diameter hydrocyclone operating at a pressure drop of 20 PSI, whereas a dirt count of 32 PPM was obtained using a 3-inch diameter hydrocyclone operating at 40 PSI pressure drop. Series cleaning using two 3-inch diameter hydrocyclones, each operated at 40 PSI pressure drop, achieved a dirt count of 8 PPM.

EXAMPLE 2

In a trial similar to Example 1 except that the continuous fiber kneading device was operated at 11.4% consistency and a temperature of 81° F., comparable dirt count was 367 PPM for the 5-inch hydrocyclone and 125 PPM for the 3-inch hydrocyclone.

EXAMPLE 3

The same fiberized and separated material used in Example 1 was instead slurried with water in a high consistency pulper at a temperature of 185° F. for 20 minutes at a consistency of 14.3%. No further hot mixing step was required, this having been accomplished in the pulper.

The treated material was diluted below 0.7% consistency and fed to the same hydrocyclones used in Examples 1 and 2. A dirt count of 72 PPM was obtained using the 5-inch diameter hydrocyclone operating at 20 PSI pressure drop, whereas dirt count was improved to 20 PPM when using the 3-inch diameter hydrocyclone operating at 40 PSI pressure drop. Series cleaning in two 3-inch diameter hydrocyclones improved dirt count to 8 PPM.

All of the foregoing examples illustrate that the method of this invention can improve the quality of fiberized wastepaper by removing ink-containing agglomerated particles from the fibrous material. It will be appreciated that the foregoing examples, given for purposes of illustration, are not to be construed as limiting the scope of this invention, which is defined by the following claims.

We claim:
1. A method for deinking wastepaper comprising:
    (a) dry fiberizing the wastepaper at a temperature of about 130° F. or greater in a manner sufficient to create ink-containing agglomerated particles having a largest dimension of from about 0.2 to about 1.5 millimeters;
    (b) slurrying the fiberized wastepaper with water at a consistency of about 5 weight percent or greater at a temperature of about 130° F. or greater with sufficient agitation to transform the agglomerated particles into a more compact and streamlined form within the size range referred to in step (a) and thereby render them more easily separable; and
    (c) separating the transformed agglomerated particles from the balance of the fiberized wastepaper using one or more centrifugal cleaners.

2. The method of claim 1 wherein the fiberized wastepaper is slurried with water at a consistency of from about 10 to about 30 weight percent.

3. The method of claim 1 wherein ink particles and ink-containing fines are removed from the fiberized wastepaper by a dry separation means prior to slurrying the fiberized wastepaper with water.

4. The method of claim 1 wherein the temperature of the water is about 150° F. or greater.

5. The method of claim 1 wherein the temperature of the water is from about 130° F. to about 212° F.

6. The method of claim 1 wherein the fiberized wastepaper is slurried with water at a consistency of about 26 weight percent.

* * * * *